UNITED STATES PATENT OFFICE.

RICHARD JONES, OF BERKELEY, ENGLAND.

PROCESS FOR PRESERVING MEAT IN THE CARCASS.

SPECIFICATION forming part of Letters Patent No. 231,807, dated August 31, 1880.

Application filed March 21, 1879. Patented in England April 25, 1878.

*To all whom it may concern:*

Be it known that I, RICHARD JONES, of Berkeley, Gloucestershire, England, have invented a Method and Process for Preserving Meat in the Carcass; and I hereby declare the following to be a full, clear, and exact description thereof.

My invention relates to a novel method for preserving meat in the entire carcass; and it consists in utilizing the circulatory organs of the blood to equally distribute throughout the body a solution of boracic acid and salicylic acid, either separately or combined, and by this action to mingle these substances intimately with the blood, so that they permeate the whole body and coagulate with the blood in every part and thoroughly preserve the meat without giving it a sodden appearance.

In carrying my invention into practice I introduce the solution into the veins before the heart has ceased to beat.

In order to relieve the process of cruelty the animal is first made insensible to pain by completely stunning it by a heavy blow on the forehead or otherwise fracturing the skull and producing pressure on the brain; or, if the meat is not required to be kept long, the spinal cord may be severed with a knife at a point a little behind the horns, and the animal will fall senseless. A large blood-vessel in the neck or elsewhere is then opened in the manner employed for bleeding, and a steel tube is then introduced into the vein, or a sharp-cutting hollow tube is inserted into some large blood-vessel in the chest or at other suitable point. Through the tube a portion of the blood escapes, and a hose may then be connected with its outer end. The hose leads to a vessel containing the solution and set at such a height above the animal that the action of gravitation will cause the solution to flow into the veins, or the solution may be injected by a syringe or force-pump; but I prefer the method before stated.

The solution is formed by dissolving thirteen and a half (13½) ounces of boracic acid in one gallon of boiling distilled or rain water, or, if preferred, the boracic acid may be combined with salicylic acid in the proportion of eleven and one-half (11½) ounces of boracic acid to two (2) ounces of salicylic acid. The solution is kept at about blood heat, which will prevent it from crystallizing or the blood from coagulating while it is being introduced.

Fifteen grains of the boracic acid or the combined acids should be used for each pound weight of the living animal, or more in hot weather or if the meat is to be kept a long time.

After the process is completed all cuts which have been made may, to prevent mold, be protected by calico or other material which has been saturated with gelatine, starch, gluten, or other analogous material mixed with some of the above solution. This placed over the cuts will adhere and form an air-tight covering.

It has been common to preserve meat by the employment of boracic or salicylic acid; but when meat is cut up and placed in a cask or otherwise saturated some time after death it presents a dark and sodden appearance. If it be forced into the blood-vessels after death and the action of the heart has ceased, it will not coagulate with the blood and remain, but will drip out like colored water, and the object will not be attained.

By my process the animal is first rendered senseless. A portion of the blood is then withdrawn, and the solution is then forced into the circulation before the heart has ceased to beat. The remaining impulses of the heart suffice to force the solution into all the blood-vessels, and it will be coagulated with the blood in the smaller capillary tubes, while the larger blood-vessels will be emptied in the usual manner and the preservative will be firmly incorporated with the whole mass, and the meat will always present a fresh bright appearance, not differing from meat recently killed and hung for a few days under ordinary circumstances.

I am aware of the patents to Prada and Nobel; but these do not interfere with my invention, as Nobel does not produce insensibility and Prada injects (as others do) without utilizing the contractile powers of the heart.

Having thus detailed my invention, I claim as new—

The process for preserving meat, consisting of introducing the preservative solution into the circulatory organs of the animal after insensibility has been produced and before the heart has ceased to beat, substantially as and for the purpose described.

In witness whereof I have hereunto set my hand and seal.

RICHARD JONES. [L. S.]

Witnesses:
J. C. RICHARDS,
11 Queen St., Gloucester, England, Solicitor of the Supreme Court of Judicature in England.
E. W. LOREN,
Guys Cliff House, the Park, Gloucester, England, Solicitor of the Supreme Court of Judicature in England.